United States Patent
Mertzel et al.

(10) Patent No.: US 6,660,360 B2
(45) Date of Patent: Dec. 9, 2003

(54) LAMINATE OF A SUBSTRATE AND AN EXTRUDED HIGH DENSITY POLYETHYLENE

(75) Inventors: Elaine Audrey Mertzel, Northville, MI (US); James Patrick Sheets, Redford, MI (US); John Walter Truskowski, Birmingham, MI (US)

(73) Assignee: Cooper Technology Services, LLC, Lima, OH (US)

( * ) Notice: Subject to any disclaimer, the term of this patent is extended or adjusted under 35 U.S.C. 154(b) by 0 days.

(21) Appl. No.: 09/735,947

(22) Filed: Dec. 13, 2000

(65) Prior Publication Data

US 2001/0055663 A1 Dec. 27, 2001

Related U.S. Application Data

(60) Provisional application No. 60/174,374, filed on Jan. 4, 2000.

(51) Int. Cl.[7] ................................. B32B 3/04
(52) U.S. Cl. ................ 428/122; 428/219; 428/216; 428/492; 428/515; 428/523; 49/490.1; 49/475.1
(58) Field of Search .................... 428/35, 521, 494, 428/122, 219, 216, 492, 515, 523; 264/171; 49/490.1, 475.1

(56) References Cited

U.S. PATENT DOCUMENTS

| | | | |
|---|---|---|---|
| 3,962,018 A | 6/1976 | Costemalle et al. |
| 4,513,044 A | 4/1985 | Shigeki et al. |
| 4,537,825 A | 8/1985 | Yardley |
| 4,676,856 A | 6/1987 | Shigeki et al. |
| 4,698,193 A | 10/1987 | Bernitz et al. |
| 4,783,931 A | 11/1988 | Kirkwood |
| 4,859,391 A | 8/1989 | Jackson |

(List continued on next page.)

FOREIGN PATENT DOCUMENTS

| | | |
|---|---|---|
| CA | 2002907 | 7/1998 |
| EP | 0 200 618 | 4/1986 |
| EP | 0200618 A1 | 10/1986 |
| EP | 325830 A | 8/1989 |
| EP | 0 502 587 | 8/1989 |
| EP | 0472267 A2 | 2/1992 |
| EP | 0502587 B1 | 9/1992 |
| EP | 0 209 453 B2 | 9/1993 |
| EP | 0372745 B1 | 1/1994 |
| EP | 0 325 830 B1 | 5/1996 |
| FR | 2 580 285 | 4/1985 |
| FR | 2580285 | 10/1986 |
| FR | 2 699 869 | 12/1992 |
| FR | 2699869 | 7/1994 |
| GB | 1423541 | 5/1973 |
| GB | 1545511 | 5/1975 |
| GB | 2109042 | 10/1982 |

(List continued on next page.)

OTHER PUBLICATIONS

High Density Polyethlene, AA60–003 Blow Molding Resin—Material Safety Data Sheet Exxon Mobil Chemical.
High Density Polyethlene, BA46–055 Blow Molding Resin—Material Safety Data Sheet Exxon Mobil Chemical.

*Primary Examiner*—Deborah Jones
*Assistant Examiner*—Jane Rhee
(74) *Attorney, Agent, or Firm*—Fay, Sharpe, Fagan, Minnich & McKee, LLP

(57) ABSTRACT

A laminate of an elastomeric substrate and a high density polyethylene having certain properties is disclosed. The preferred high density polyethylene has a density of from 0.940 to 1.000 g/cm³, a melt index of less than 10 grams per 10 minutes under conditions of 190° C. and 2.160 kg load and 298.2 kPa, and a melt index of greater than 5 grams per 10 minutes under conditions of 190° C. and 21.6 kg load and 2,982.2 kPa pressure. The laminate is particularly well suited for use in automotive seals.

13 Claims, 2 Drawing Sheets

U.S. PATENT DOCUMENTS

| | | |
|---|---|---|
| 4,913,976 A | 4/1990 | Brooks et al. |
| 4,923,759 A | 5/1990 | Brooks et al. |
| 4,937,126 A | 6/1990 | Jackson |
| 4,969,294 A | 11/1990 | Guillon et al. |
| 4,973,375 A | 11/1990 | Itaya et al. |
| 4,975,306 A | 12/1990 | Jackson |
| 5,007,202 A | 4/1991 | Guillon et al. |
| 5,013,379 A | 5/1991 | Brooks et al. |
| 5,014,464 A | 5/1991 | Dupuy et al. |
| 5,043,204 A | 8/1991 | Itaba et al. |
| 5,137,675 A | 8/1992 | Rabe |
| 5,145,728 A | 9/1992 | Itaba et al. |
| 5,151,307 A | 9/1992 | Jackson |
| 5,183,613 A | 2/1993 | Edwards |
| 5,302,463 A | 4/1994 | Murata et al. |
| 5,306,537 A | 4/1994 | Gustafson et al. |
| 5,306,775 A | 4/1994 | Martin et al. |
| 5,319,029 A | 6/1994 | Martin et al. |
| 5,372,881 A | 12/1994 | Roller et al. |
| 5,378,543 A | 1/1995 | Murata et al. |
| 5,380,803 A | 1/1995 | Coutant et al. |
| 5,415,822 A | 5/1995 | Cook |
| 5,424,019 A | 6/1995 | Miyakawa et al. |
| 5,424,135 A | 6/1995 | Murata et al. |
| 5,447,671 A | 9/1995 | Kato et al. |
| 5,545,448 A | 8/1996 | Ford et al. |
| 5,635,274 A | 6/1997 | Chihara et al. |
| 5,746,867 A | 5/1998 | Chihara et al. |
| 6,024,906 A | 2/2000 | Cook |
| 6,099,676 A | 8/2000 | Hayashi |
| 6,128,859 A | 10/2000 | Vance |

FOREIGN PATENT DOCUMENTS

| | | |
|---|---|---|
| JP | 55144157 A | 11/1980 |
| JP | 57-32950 | 2/1982 |
| JP | S57-32950 | 7/1982 |
| JP | 59201838 | 11/1984 |
| JP | 60114020 | 6/1985 |
| JP | 60165227 | 8/1985 |
| JP | S63-137018 | 5/1988 |
| JP | H2-14143 | 1/1990 |
| JP | H2-89639 | 3/1990 |
| JP | 2076716 | 3/1990 |
| JP | H4-189134 | 7/1992 |
| WO | 00/03884 | 1/2000 |
| WO | 00/07839 | 2/2000 |

LAMINATE OF A SUBSTRATE AND AN EXTRUDED HIGH DENSITY POLYETHYLENE

CROSS REFERENCES TO RELATED APPLICATIONS

The present application claims priority from U.S. provisional application Ser. No. 60/174,374 filed Jan. 4, 2000.

FIELD OF THE INVENTION

The present invention relates to a laminate of an elastomeric substrate and a high density polyethylene (HDPE) having a melt index within a selected range. A preferred embodiment of the present invention relates to a seal having a low coefficient of friction and high abrasion resistance properties for an automotive vehicle.

BACKGROUND OF THE INVENTION

The automotive industry uses elastomeric, thermoplastic and thermoplastic elastomeric materials, as well as combinations of such materials for many automotive applications. Each type of material has different physical properties and particular advantages for specific uses.

Elastomeric materials such as synthetic and natural rubbers as well as thermoplastic elastomeric materials are commonly used in the manufacture of automotive vehicles for seals, glass run channel, and other purposes. These materials have advantageous physical properties for sealing purposes. However, these materials have relatively high coefficients of friction and, in some cases, present a surface which has a relatively poor appearance and is difficult to color. For example, where these elastomeric materials are used in the manufacture of automotive glass run channel, provisions must be made to reduce the coefficient of friction to allow an associated glass panel to slide against the channel easily and without excessive wear on the elastomeric surface. One method of accomplishing this is to provide a coating on the elastomer or thermoplastic elastomer to provide a surface which has a low coefficient of friction and which is wear resistant. Traditionally, flocking was used to provide such a surface. In more recent years, various kinds of polymeric coatings such as polyethylene polymers have been used as coatings or layers.

Although efforts to coat or laminate a polyethylene material onto an elastomeric material have been carried out, the efforts have not been entirely satisfactory. For example, low and medium density polyethylene polymers are characterized by relatively low melting points. The low melting points allow the materials to be easily extruded but their uses are limited to applications where the polyethylene material will not encounter elevated temperatures. Thus, if such materials are applied to green rubber, the processing temperatures involved in later curing the rubber would cause such low melting point polyethylene polymers to become fluid and to flow out of the desired location of application. The class of polyethylene polymers known as ultra high molecular weight polyethylene polymers do not readily melt and are known and used in, for example, glass run channel. However, ultra high molecular weight polymers are expensive and difficult to process. For example, these polymers are preprocessed into the form of tapes because they cannot be extruded in a conventional extruder as they do not readily melt. They also are difficult to bond to rubber material.

As mentioned above, there have been efforts to utilize polyethylene materials to coat or layer onto elastomeric materials such as rubber. For example, U.S. Pat. No. 4,913,976 issued Apr. 3, 1990, to Brooks et al. describes a process for forming a laminate of a wear resistant thermoplastic and a weather resistant rubber. The thermoplastic layer, which can be polyethylene or polypropylene, is not melted but is processed at an ambient or a warm temperature by extruding through a crosshead die which places it into contact with the heated rubber. Mechanical bonding or fusion of the thermoplastic to the rubber is said to be achieved by melting the thermoplastic interface in contact with the rubber.

U.S. Pat. No. 5,007,202 issued Apr. 16, 1991, to Guillon discloses a guiding slideway for a motor vehicle window. The slideway is shaped to constitute a resiliently deformable toggle action linkage. The portions of the slideway which come into contact with the window are advantageously provided with a coating for facilitating sliding. The coating is preferably obtained by coextruding a polyolefin or a polytetrafluoroethylene together with the elastomer or plastomer of the slideway.

U.S. Pat. No. 5,014,464 issued May 14, 1991, to Dupuy et al. discloses a window pane sealing strip having a flexible reinforced glass-run channel. The strip includes a low friction finish which can be a coextruded low friction surface.

U.S. Pat. No. 5,183,613 issued Feb. 2, 1993, to Edwards discloses a process for the preparation of solventless, low friction, abrasion resistant coatings for elastomeric substrates.

While various processes for applying a low friction, wear resistant coating of polyethylene onto rubber are known, there remains a need for improvements in these processes. For example, the relatively high cost of ultra high molecular weight polyethylene and the difficulties encountered during processing of this type of polyethylene are disadvantageous. Other, lower molecular weight polyethylene materials can be easily processed but have high coefficients of friction and low abrasion resistance.

Therefore, and in accordance with the present invention, a polyethylene material is used which overcomes the aforementioned difficulties. Thus, a high density polyethylene with a load melt index within a particular specified range is extruded onto an elastomeric or thermoplastic elastomeric substrate to provide an improved laminate. The laminate of this invention can be made by a straightforward and economical process and the products thereof are particularly well suited for making automotive seals such as glass run channels, belt weather seals, colored rubber applications, and the like. The process uses economical materials, provides a good bond between the coating and the elastomer or thermoplastic elastomer, and provides a product having a coating or layer with a low coefficient of friction and excellent abrasion resistance and appearance as well as other desirable physical properties. Further understanding of the present invention will follow from the disclosure and claims taken in conjunction with the accompanying drawings.

SUMMARY OF THE INVENTION

The present invention provides, in a first aspect, a laminate assembly adapted for use as a weatherstrip seal. The laminate assembly includes an elastomeric substrate and a thin layer of a material that includes a particular type of polyethylene having certain physical characteristics. The thin layer has a thickness of less than 500 microns. The polyethylene exhibits a melt index of less than 10 grams per 10 minutes under conditions of 190 degrees centigrade, 2.160 kg total load and 298.2 kPa pressure. The polyethylene has a density of from about 0.940 to about 1.000 g/cm$^3$.

In another aspect, the present invention provides a laminate assembly adapted for use as a weatherstrip seal in which the assembly comprises an elastomeric substrate and a thin layer of material disposed on and affixed to at least a portion of the substrate. The layer has a thickness of less than 500 microns and includes a certain polyethylene material. The polyethylene exhibits a melt index of greater than 5 grams per 10 minutes under conditions of 190 degrees centigrade, 21.6 kg total load, and 2982.2 kPa pressure. The polyethylene has a density of from about 0.940 to about 1.000 g/cm$^3$.

In another aspect, the present invention provides a laminate product comprising (i) a substrate which is either natural rubber, synthetic rubber, a thermoplastic polyolefin, or a thermoplastic vulcanizate, and (ii) a high density polyethylene polymer layer disposed on the substrate. The polyethylene exhibits a melt index of less than 10 grams per 10 minutes under conditions of 190 degrees centigrade and 2.160 kg total load and 298.2 kPa pressure and a melt index of greater than 5 grams per 10 minutes under conditions of 190 degrees centigrade and 21.6 kg total load and 2982.2 kPa pressure.

In yet another aspect, the present invention provides a glass run channel that includes a substrate and a high density polyethylene layer disposed on the substrate. The substrate is selected from either natural rubber, synthetic rubber, a thermoplastic polyolefin, or a thermoplastic vulcanizate. The polyethylene exhibits a melt index of less than 10 grams per 10 minutes under conditions of 190 degrees centigrade, 2.160 kg total load, and 298.2 kPa pressure. The polyethylene also exhibits a melt index of greater than 5 grams per 10 minutes under conditions of 190 degrees centigrade, 21.6 kg total load, and 2982.2 kPa pressure.

In yet another aspect, the present invention provides a belt weatherstrip comprising a substrate, which may be one or more of a natural rubber, synthetic rubber, thermoplastic polyolefin, and thermoplastic vulcanizate, and a high density polyethylene layer. The polyethylene has a melt index of less than 10 grams per 10 minutes under conditions of 190 degrees centigrade, 2.160 kg total load, and 298.2 kPa pressure. The polyethylene also exhibits a melt index of greater than 5 grams per 10 minutes under conditions of 190 degrees centigrade, 21.6 kg total load, and 2982.2 kPa pressure.

Furthermore, the present invention also provides a method of making an extruded laminate comprising co-extruding a substrate and a certain high density polyethylene. The substrate may be synthetic rubber, natural rubber, thermoplastic polyolefin, or a thermoplastic vulcanizate. The polyethylene has a particular melt index as previously described.

DESCRIPTION OF THE PREFERRED EMBODIMENTS

Generally, the present invention is a laminate of an extruded layer of high density polyethylene having a specified melt index and a substrate selected from the group consisting of natural rubber, synthetic rubber, and thermoplastic elastomers. Preferably the substrate is selected from the group consisting of synthetic rubbers, thermoplastic olefins, and thermoplastic vulcanizates. The melt index of the polyethylene is determined by ASTM D-1238 and is less than 10 grams per 10 minutes under conditions of 190 degrees centigrade, 2.160 kg total load and 298.2 kPa pressure and is greater than 5 grams per 10 minutes under conditions of 190 degrees centigrade, 21.60 kg total load and 2982.2 kPa pressure. The laminate is preferably made by coextruding polyethylene and an elastomeric substrate and then, if the elastomer is rubber, curing the rubber with heat to provide a product having good sealing qualities, a surface with a low coefficient of friction and high abrasion resistance, and with good appearance for use as a glass run channel, belt weather strip and the like.

Figure 1:
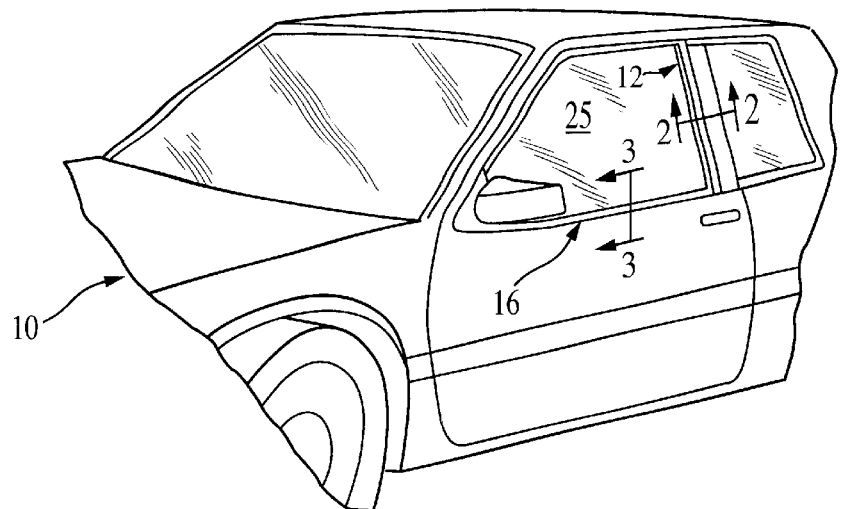
FIG. 1 is a side elevational view of an automotive vehicle, shown with a portion broken away, having preferred embodiments of a glass run channel and a belt weatherstrip of the present invention installed thereon.
Figure 2:
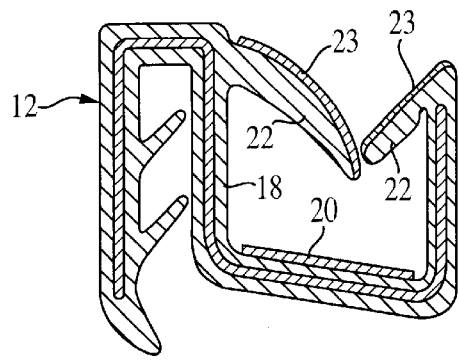
FIG. 2 is a cross-sectional view taken along line 2—2 in FIG. 1 with the associated structure of the automotive vehicle removed.
Figure 3:
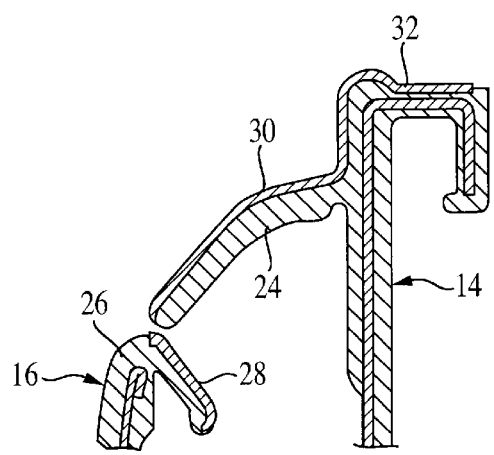
FIG. 3 is a cross-sectional view taken along line 3—3 in FIG. 1 with the associated structure of the automotive vehicle removed.

Now referring to FIGS. 1–3, an automotive vehicle is shown and indicated generally by the numeral 10. Vehicle 10 has preferred embodiments of the present invention laminate installed thereon. Thus, installed on vehicle 10 are glass run channel 12 and inner and outer belt weatherstrips 14 and 16, respectively. It will be appreciated by those skilled in the art that the inner belt weatherstrip 14 cannot be seen in FIG. 1. Generally speaking, glass run channel 12 has an elastomeric substrate 18, which is, for example comprised of an ethylene propylene diene terpolymer (EPDM) rubber material. Glass run channel 12 may be conventional in structure except for the materials of which it is comprised and, thus, is typically formed generally into a shape of a conventional U-shaped channel. A layer of high density polyethylene material having a melt index within the selected range as described herein is bonded to substrate 18 of glass run channel 12 in the web portion thereof to form seat 20. Other layers of the high density polyethylene material are applied and bonded to limbs 22 to form slip coatings 23. The polyethylene layers function as high abrasion resistant, low-friction surfaces to allow relatively free movement of a glass panel 25 within the channel.

Inner and outer belt weatherstrips 14 and 16 each are a laminate comprising an elastomeric substrate 24 and 26, respectively, and a layer of high density polyethylene 28 and 30, respectively. Layers 28 and 30 function as low coefficient of friction and high abrasion resistance slip coats to allow free movement of glass panel 25, while layer 30 also has a portion 32 which is visible and presents a pleasing appearance. It will be appreciated by those skilled in the art that inner and outer belt weatherstrips 14 and 16 may utilize a configuration which is conventional in the art. However, these laminates are comprised of the novel combination of materials of the present invention and obtain the advantages and economies thereof.

The elastomeric substrates 18, 24, and 26 are comprised of a material selected from the group consisting of natural rubber, synthetic rubber, and thermoplastic elastomer material. Preferably the rubber is EPDM and the thermoplastic elastomer is a thermoplastic olefin or a thermoplastic vulcanizate. However, for most uses any typical rubber or thermoplastic elastomer will be suitable. Examples of typical rubbers include EPDM rubber, i.e., ethylene-propylene terpolymer, which is preferred because of its availability and cost, as well as other butadiene based rubbers of styrene butadiene rubber and nitrile rubber or acrylonitrilebutadiene rubber as well as natural rubber and synthetic isoprene rubber.

Thermoplastic elastomers which are suitable for use in the present invention include a broad range of elastomers. Especially preferred for use heroin are thermoplastic olefins and thermoplastic vulcanizates. These materials are commercially available and are well known for use in the automotive industry. Such materials are now being used for automotive glass run channel, seals and for other purposes. However, these materials are in need of layers or coatings to lower their coefficient of friction and increase their abrasion resistance. These improvements are obtained by use of the high density polyethylene material used in the present invention in conjunction with the thermoplastic elastomer materials.

High density polyethylene materials having the selected melt index and suitable for use herein are known and are commercially available but have not been heretofore appreciated for use as in the present invention. The high density polyethylene materials are polymers known for other uses such as blow molding compounds and for extrusion. These polyethylenes are suggested for applications requiring high melt strength, such as for large containers, light gauge sheet and dairy bottles, fuel tanks, bulk containers and drums.

The high density polyethylene material used in the present invention has a density of from about 0.900 to about 1.250 g/cm$^3$ and preferably from about 0.940 to about 1.000 g/cm$^3$ as determined by ASTM D-4883. Furthermore the high density polyethylene material has a melt index of less than 10 grams per 10 minutes as determined by ASTM D-1238 under conditions of 190 degrees centigrade and 2.160 kg total load and 298.2 kPa pressure and a melt index of greater than 5 grams per 10 minutes under conditions of 190 degrees centigrade and 21.6 kg total load and 2982.2 kPa pressure.

Preferred high density polyethylene material is commercially available from Exxon Chemical under the tradename PAXON®, such as PAXON® BA 46-055 and PAXON® AA60-003 blow molding resins. Suitable high density polyethylene compounds can be medium molecular weight or high molecular range. The polyethylene polymers used herein are highly crystalline, high density, high and medium molecular weight branched polymers with excellent melt strength and uniformity, excellent abrasion resistance, low coefficient of friction, excellent cold flexibility, no stress whitening, high stiffness and impact strength, excellent chemical resistance and high stress cracking resistance.

Tables 1 and 2 set forth below, list various properties of these preferred commercially available high density polyethylene materials.

TABLE I

PAXON ® AA60-003 Blow Molding Resin

| Properties | ASTM Method | Nominal Value | |
|---|---|---|---|
| | | Units (English) | Units (SI) |
| Classification | | | |
| Type | D-4976 | | IV |
| Class | D-4976 | | A |
| Category | D-4976 | | 5 |
| Melt Index, 190/2.16 | D-1238 | 0.25 g/10 min | 0.25 g/10 min |
| Density | D-4883 | 60.2 lbs/ft$^3$ | 0.963 g/cm$^3$ |
| Mechanical (23° C. 50% relative humidity, unless otherwise noted) | | | |
| Tensile Strength at Yield | D-638 | 4,400 psi | 30 MPa |
| Tensile Strength at Break | D-638 | 2,100 psi | 15 MPa |
| Elongation at Yield | D-638 | 8.0% | 8.0% |
| Elongation at Break | D-638 | 350% | 350% |
| Tensile Modulus of Elasticity | D-638 | 270,000 psi | 1,860 MPa |
| Flexural Modulus[1] | D-790 | 215,000 psi | 1,480 MPa |
| Flexural Stiffness, Cantilever Beam | D-747 | 145,000 psi | 1,000 MPa |
| Tensile Impact | D-1822 | 100 ft. lbs/in$^2$ | 20 joules/cm$^2$ |
| Impact Brittleness Temperature | D-746 | <−105° F. | <−76° C. |
| Environmental Stress Crack Resistance[2] | D-1693 | 14 hrs | 14 hrs |
| Hardness, Shore D | D-2240 | 70 | 70 |
| Thermal | | | |
| Vicat Softening Temperature | D-1525 | 260° C. | 127° C. |
| Heat Deflection Temperature, 66 psi load | D-648 | 175° F. | 80° C. |
| Coefficient of Linear Thermal Expansion | D-696 | 6 × 10$^{-5}$ in/in ° F. | 1.1 × 10$^{-4}$ cm/cm/° C. |
| Processing | | | |
| Bulk Density | D-1895 | 37 lbs/ft$^3$ | 590 kg/m$^3$ |

[1]Method 1, Procedure A (1" × 3" × 0.125"), Tangent calculation.
[2]Condition B, Specimen thickness: 0.070"–0.080", notch depth: 0012"–0.015", 50° C., 100% Igepal.

TABLE 2

PAXON ® BA46-055 Blow Molding Resin

| | | Nominal Value | |
|---|---|---|---|
| Properties | ASTM Method | Units (English) | Units (SI) |
| Classification | | | |
| Type | D-4976 | | III |
| Class | D-4976 | | A |
| Category | D-4976 | | 5 |
| Melt Index, 190/2.16 | D-1238 | <0.1 g/10 min | <0.1 g/10 min |
| Flow Rate, 190/21.6 (HLMI) | D-1238 | 5.5 g/10 min | 5.5 g/10 min |
| Density | D-4883 | 59.1 lbs/ft$^3$ | 0.946 g/cm$^2$ |
| Mechanical (23° C. 50% relative humidity, unless otherwise noted) | | | |
| Tensile Strength at Yield | D-638 | 3,500 psi | 25 MPa |
| Elongation at Break | D-638 | 1100% | 1100% |
| Flexural Modulus[1] | D-790 | 150,000 psi | 1,030 MPa |
| Tensile Impact | D-1822 | 340 ft lbs/in$^2$ | 70 joules/cm$^2$ |
| Tensile Impact @ −40° C. | D-1822 | 200 ft lbs/in$^2$ | 45 joules/cm$^2$ |
| Impact Brittleness Temperature | D-746 | <−105° F. | <−76° C. |
| Environmental Stress Crack Resistance[2] | D-1693 | >1000 hrs | >1000 hrs |
| Hardness, Shore D | D-2240 | 67 | 67 |
| Thermal | | | |
| Vicat Softening Temperature | D-1525 | 264° F. | 129° C. |
| Heat Deflection Temperature, 66 psi load | D-648 | 161° F. | 72° C. |
| Coefficient of Linear Thermal Expansion | D-696 | 7 × 10$^{-6}$ in/in/° F. | 1.2 × 10$^{-4}$ cm/cm/° C. |
| Processing | | | |
| Bulk Density | D-1895 | 36 lbs/ft$^3$ | 580 kg/m$^3$ |

[1]Method 1, Procedure A (1" × 3" × 0.125"), Tangent calculation.
[2]Condition B, Specimen thickness: 0.070"–0.080", notch depth: 0.012"–0.015", 50° C., 100% Igepal.

Laminate seal assemblies according to the present invention may be in a variety of forms, configurations, and sizes. As will be appreciated, these parameters are generally dictated by the end use requirements of the laminate assembly. One aspect of the present invention laminates relates to the thickness of the layer of HDPE applied onto a substrate. Although thicknesses may vary, again, depending upon the specific requirements of the intended application, it is preferred that the layer of HDPE have a thickness in the range of from about 500 microns to near zero. Most preferably, the thickness range is from about 300 microns to about 1 micron. Depending upon the particular configuration of the laminate, different thicknesses may be utilized at different regions on the same piece or seal. For example, referring to FIG. 2, the layers of slip coatings 23 disposed on limbs 22, preferably have a thickness in the range of from about 5 microns to about 100 microns. And, the layer of slip coating or seat 20 disposed in the base region of substrate 18, preferably has a thickness of from about 5 microns to about 200 microns. Generally, the thicknesses of such layers are dictated by the estimated service life of the laminate, e.g. seal; the physical properties of the resulting laminate; and the cost of the HDPE material forming the layer(s).

An example of a preferred form of the present invention laminate is a tape form. Such a form enables long strips of laminate to be rolled and easily stored. Furthermore, a backing strip may be provided along one or more faces of the laminate that, when removed, reveals a layer of adhesive or other desired composition.

It is contemplated that the present invention laminates may include one or more coloring agents, pigments, or other additives to provide an aesthetic appearance to the final product. Furthermore, as known to those skilled in this field of art, other additives and agents may be added to either or both of the substrate material or to the polyethylene. Examples of additives typically employed in laminate seals are described in U.S. Pat. No. 5,183,613 herein incorporated by reference.

Figure 4:
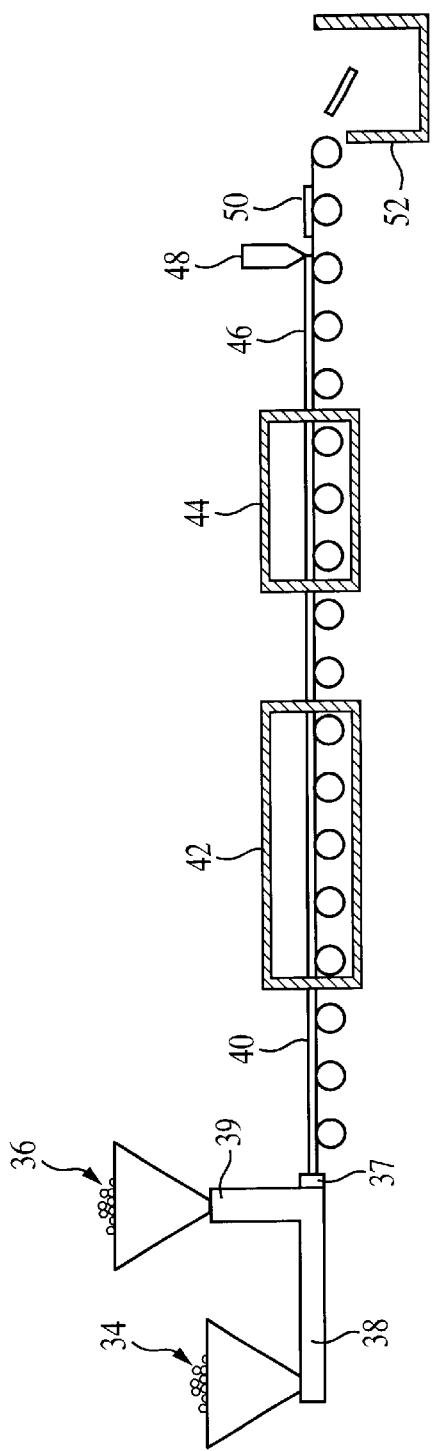
FIG. 4 is a schematic view illustrating a preferred process of the present invention.

Now referring to FIG. 4, a preferred method of making a laminate of the present invention is generally illustrated. Thus, green EPDM rubber 34 is coextruded with high density polyethylene pellets 36 suitable for use in the present invention through die 37 by extruders 38 and 39, respectively, to form a laminar coextrudate 40 of uncured rubber and high density polyethylene having a melt index within a selected range as set forth above. The polyethylene is layered to form seat 20 as well as slip coats 23. The laminar extrudate is then passed through curing oven 42 wherein the rubber is cured with heat. After curing oven 42, the laminar extrudate is passed into cooling tank 44 and then optionally passed through suitable forming rolls (not shown in the figure) to shape the laminar extrudate, or laminate 46 into a desired channel shape for use as a glass run channel. The laminate 46 is then cut into appropriate lengths 50 at station 48 and placed into storage bin 52.

Of course, it will be appreciated that in an analogous but alternative method, to that shown in FIG. 4, thermoplastic polyolefin or thermoplastic vulcanizate is coextruded with high density polyethylene pellets 36 by extruders 38 and 39 through die 37 to form laminar coextrudate 40. In this case, of course, the coextrudate 40 need not be passed through curing oven 42 as no curing step is required and the coextrudate can be transported without further processing to station 48 where it is cut into appropriate lengths 50.

Figure 5:
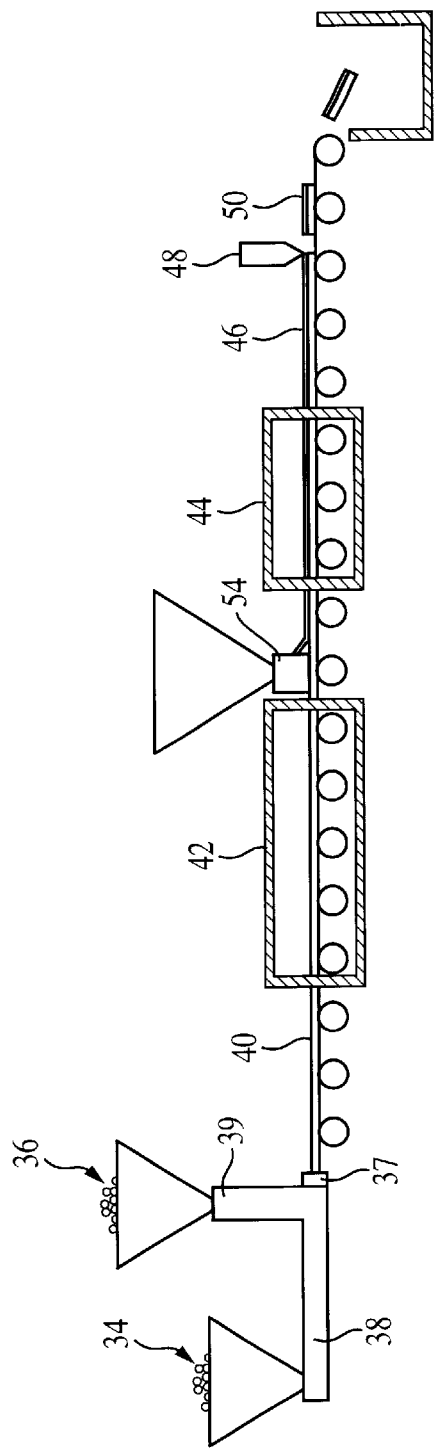
FIG. 5 is a schematic view similar to that of FIG. 4 illustrating an alternative preferred process of the present invention.

A further alternative method is illustrated in FIG. 5 wherein, in a manner analogous to the method of FIG. 4, green EPDM rubber 34 is coextruded with high density polyethylene pellets 36 of the present invention by extruders 38 and 39 and through die 37 to form a laminar extrudate of uncured rubber and high density polyethylene 40. The laminar extrudate is then optionally passed through oven 42 to cure or partially cure the rubber. Then additional high density polyethylene pellets of the present invention are extruded by extruder 54 onto a surface of the laminar extrudate. If the rubber was not substantially cured by earlier application of heat it should now be passed through an oven (not shown in the figure) to effect curing of the rubber. An example of this process would be to first extrude high density polyethylene to form the seat at 20 in FIG. 2 and second to extrude high density polyethylene to form the slip coats 23 as shown in FIG. 2.

The process parameters utilized for forming a laminate in accordance with the present invention may vary widely. In particular, the process conditions at the extruders in the process schematics illustrated in FIGS. 4 and 5, will also highly depend upon the choice of materials used in the laminate. However, one set of operating conditions is described below in forming a laminate seal comprising a substrate of EPDM rubber and a thin layer of HDPE as described herein. The HDPE material is PAXON® BA46-055.

Typical temperatures employed in an extruder into which is fed the HDPE material are set forth in Table 3 as follows:

TABLE 3

Typical Extruder Temperatures

| Extruder Zone | Preferred Temperature | Acceptable Temperature |
|---|---|---|
| 1 | 149 C. (300 F.) | 149–177 C. (300–350 F.) |
| 2 | 177 C. (350 F.) | 177–199 C. (350–390 F.) |
| 3 | 193 C. (380 F.) | 216–227 C. (420–440 F.) |
| @ Die | 216 C. (420 F.) | 210–221 C. (410–430 F.) |

Typical line speed for the processes depicted in FIGS. 4 and 5, is about 12 meters per minute. It is contemplated that significantly higher line speeds may be employed, such as for instance 20 meters per minute.

Oven temperatures typically are about 250 C, however hotter or cooler environments may be used as are necessary.

EXAMPLES

A series of tests were conducted in which the properties of several preferred embodiment commercially available high density polyethylenes, and laminate products utilizing those polyethylenes, were investigated.

In a first series of tests, the coefficient of friction of a preferred embodiment high density polyethylene, commercially available under the designation PAXON® AA60-003, was measured. The coefficient of friction between two surfaces is the ratio of the force required to move one over the other to the total force pressing the two together. The lower the value the better. The values expressed herein were obtained by moving a plaque of the material being tested over the surface of a glass face.

A conventional laminate sealing channel piece available under the designation Linklon™ was compared to two samples, designated as A and B, of laminate according to the present invention. Specifically, sample A consisted of a thin layer of the noted HDPE that was deposited upon an EPDM substrate. Sample A utilized a relatively transparent layer of HDPE without any coloring or pigmenting agent. Sample B was identical to Sample A except that the HDPE material included a black coloring agent. Table 4 set forth below summarizes the results of this test. Clearly, the laminate samples utilizing the HDPE according to the present invention exhibited significantly superior coefficient of friction characteristics than a conventional laminate.

TABLE 4

Coefficient of Friction

| Part/Material | Value |
|---|---|
| Linklon ™ | 0.20 |
| Sample A | 0.11 |
| Sample B | 0.12 |

In another series of tests, the sliding resistance of preferred embodiment laminates utilizing EPDM substrates were compared to conventional laminate seals currently used in the automotive industry. Table 5 set forth below summarizes various aspects and measurements of these tests in which a commercially available seal, designated as "Seal 1", was compared to a preferred embodiment laminate seal according to the present invention, designated as Sample C. Seal 1 and Sample C were geometrically identical. Similarly, Table 5 also compares measurements of another conventional laminate seal, designated as "Seal 2", to a preferred embodiment laminate seal designated as Sample D. Seal 2 and Sample D were geometrically similar. Samples C and D were laminate seals according to the preferred embodiment of the present invention. These comprised a substrate of EPDM rubber upon which was deposited a thin layer of a PAXON® AA60-003 HDPE.

TABLE 5

Sliding Resistance

| Condition | Resistance | Requirement (Max) (N) | Condition | Resistance (N) |
|---|---|---|---|---|
| Commercially Available Seal 1 | | | Sample C | |
| Original 3.5 | 3.98 | 5.9 | Original 3.5 | 2.03 |
| Original 5.0 | 2.01 | 7.8 | Original 5.0 | 0.00 |
| Water | 2.35 | 9.8 | Water | 3.14 |
| W/O Water | 1.21 | 8.8 | W/O Water | 1.74 |
| Abrasion | 1.68 | 6.9 | Abrasion | 0.00 |
| wet Original 3.5 | 0.48 | 8.8 | wet Original 3.5 | 1.73 |
| wet Original 5.0 | 0.27 | 14.7 | wet Original 5.0 | 0.00 |
| wet Water | 3.53 | 11.8 | wet Water | 3.02 |
| wet W/O | 2.81 | 12.7 | wet W/O | 2.10 |
| wet Abrasion | 3.46 | 10.8 | wet Abrasion | 0.00 |
| Commercially Available Seal 2 | | | Sample D | |
| Original 3.5 | 3.64 | 5.9 | Original 3.5 | 3.50 |
| Original 5.0 | 16.26 | 7.8 | Original 5.0 | 0.00 |
| Water | 3.39 | 9.8 | Water | 4.01 |
| W/O Water | 2.76 | 8.8 | W/O Water | 4.46 |
| Abrasion | 5.32 | 6.9 | Abrasion | 0.00 |
| wet Original 3.5 | 1.70 | 8.8 | wet Original 3.5 | 3.59 |
| wet Original 5.0 | 7.16 | 14.7 | wet Original 5.0 | 0.00 |
| wet Water | 4.26 | 11.8 | wet Water | 3.64 |
| wet W/O | 5.47 | 12.7 | wet W/O | 3.89 |
| wet Abrasion | 4.07 | 10.8 | wet Abrasion | 0.00 |

A brief explanation of Table 5 is as follows. Referring to the first and fourth columns, "Original 3.5" and "Original 5.0" refer to test conditions utilizing clean and dry glass substrates having thicknesses of 3.5 mm and 5.0 mm, upon which the various laminate seals are moved across. The reference to "Water" refers to application of water to the test surface during measurement of sliding resistance. The reference to "W/O Water" refers to removal of the water, previously deposited on the test surface. The reference to "Abrasion" refers to application of a dry, abrasive composition deposited between the laminate piece and glass surface. All of the foregoing noted conditions were generally such that the test pieces were initially dry or substantially so. The next five references, all noted as "wet", were as previously described however, were conducted using test pieces that had been previously exposed to water and which retained water.

Referring further to Table 5, the second column designated "Resistance" was the actual force (in Newtons) measured in moving the noted test piece (the commercially available seal) across the glass surface under the noted conditions. The third column is a set of typical requirement specifications utilized by a major automotive manufacturer. These are included in Table 5 to illustrate the typical demands placed upon a provider of laminate seals in this industry. The fifth column lists the actual force (in Newtons) measured in moving the noted test piece (a sample according to a preferred embodiment of the present invention) across the same glass surface under the noted conditions, as was used in testing the commercially available sample.

As demonstrated by the results set forth in Table 5, in many of the trials, the sliding resistance of the preferred embodiment laminate seals were significantly less than corresponding measurements from conventional laminates. And, more importantly, the measured sliding resistance values of the preferred embodiment laminate seals, for all tested conditions, significantly surpassed all required specifications typically used in the automotive industry.

In yet another series of tests, corner pull strength measurements were made in which various Linklon™ laminate seals were compared against a preferred embodiment seal comprising a layer of PAXON® AA60-003 deposited on a substrate of EPDM. In this investigation, a test piece, generally constituting a corner of a laminate seal, was placed in an Instron™ device and the tensile force prior to fracture was measured. The tests were conducted under three sets of conditions: (i) ambient temperature, (ii) 80° C., and (iii) after ten days of heated aging. Heat aging was conducted by exposing the test pieces to a temperature of 80° C. for 10 days. The measurements reported in Table 6 are for a conventional Linklon™ seal, and those reported in Table 7 are for preferred embodiment laminate seals according to the present invention.

TABLE 6

Corner Pull Tests Utilizing Linklon ® Seals

| Molded Corners with Linklon ™ Part | Room Temp Pulls force (N) | 80 C. Pulls force (N) | 10 D Heat Age force (N) |
| --- | --- | --- | --- |
| 1 | 406 | 171 | 468 |
| 2 | 447 | 174 | 486 |
| 3 | 367 | 156 | 420 |
| 4 | 307 | 147 | 463 |
| 5 | 401 | 201 | 466 |
| 6 | 406 | 170 | 420 |
| 7 | 287 | 147 | 412 |
| 8 | 357 | 147 | 350 |

TABLE 7

Corner Pull Tests Utilizing Preferred Embodiment Seals

| Molded Corners with STM 2000 (Paxon) in base Part | Room Temp Pulls force (N) | 80 C. pulls force (N) | 10 D Heat Age force (N) |
| --- | --- | --- | --- |
| E | 457 | 273 | 454 |
| F | 420 | 229 | 418 |
| G | 472 | 287 | 488 |
| H | 405 | 281 | 375 |

The results of the testing summarized in Tables 6 and 7 illustrate that in most respects, the test pieces of the preferred embodiment of the present invention are stronger than a conventional laminate seal. Typical automotive seal requirements demand that the minimum pull strength at room temperature be at least 98 Newtons, and for the ten day heat age, be at least 58.8 Newtons. The present invention laminate seal assembly easily surpasses these requirements.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

What is claimed is:

1. A glass run channel comprising a substrate and a high density polyethylene layer disposed on said substrate, said substrate selected from the group consisting of natural rubber, synthetic rubber, thermoplastic polyolefin and thermoplastic vulcanizates, and said polyethylene having a melt index of less than 10 grams per 10 minutes as determined by ASTM D-1238 under conditions of 190 degrees centigrade and 2.160 kg total load and 298.2 kPa pressure and a melt index of greater than 5 grams per 10 minutes under conditions of 190 degrees centigrade and 21.6 kg total load and 2982.2 kPa pressure.

2. The glass run channel of claim 1 wherein said substrate defines a channel region and said layer of polyethylene is disposed in said channel.

3. The glass run channel of claim 1 wherein said polyethylene has a density of from about 0.900 to about 1.250 g/cm$^3$.

4. The glass run channel of claim 1 wherein said polyethylene has a density of from about 0.940 to about 1.000 g/cm$^3$.

5. The glass run channel of claim 1 wherein said layer of polyethylene has a thickness less than 500 microns.

6. The glass run channel of claim 5 wherein said layer of polyethylene has a thickness of from about 300 microns to about 1 micron.

7. The glass run channel of claim 6 wherein said layer of polyethylene has a thickness of from about 200 microns to about 5 microns.

8. A belt weatherstrip comprising (i) a substrate selected from the group consisting of natural rubber, synthetic rubber, thermoplastic polyolefin and thermoplastic vulcanizate, and (ii) a high density polyethylene layer disposed on at least a portion of said substrate, said polyethylene having a melt index of less than 10 g per 10 minutes as determined by ASTM D-1238 under conditions of 190 degrees centigrade and 2.160 kg total load and 298.2 kPa pressure and a melt index of greater than 5 grams per 10 minutes under conditions of 190 degrees centigrade and 21.6 kg total load and 2982.2 kPa pressure.

9. The belt weatherstrip of claim 8 wherein said polyethylene has a density of from about 0.900 to about 1.250 g/cm$^3$.

10. The belt weatherstrip of claim 8 wherein said polyethylene has a density of from about 0.940 to about 1.000 g/cm$^3$.

11. The belt weatherstrip of claim 8 wherein said layer of polyethylene has a thickness less than 500 microns.

12. The belt weatherstrip of claim 11 wherein said layer of polyethylene has a thickness of from about 300 microns to about 1 micron.

13. The glass run channel of claim 1, wherein said high density polyethylene layer includes at least one of a coloring agent, a pigment, and an additive to provide an aesthetic appearance to said glass run channel.

* * * * *